(12) United States Patent
Wang et al.

(10) Patent No.: US 7,700,673 B2
(45) Date of Patent: Apr. 20, 2010

(54) REDUCED OIL RUBBER COMPOSITIONS INCLUDING N-SUBSTITUTED POLYALKYLENE SUCCINIMIDE DERIVATES AND METHODS FOR PREPARING SUCH COMPOSITIONS

(75) Inventors: Xiaorong Wang, Hudson, OH (US); Victor J. Foltz, Akron, OH (US); William L. Hergenrother, Akron, OH (US); Koji Masaki, Tokyo (JP)

(73) Assignee: Bridgestone Corporation (JP)

( * ) Notice: Subject to any disclaimer, the term of this patent is extended or adjusted under 35 U.S.C. 154(b) by 402 days.

(21) Appl. No.: 11/615,659

(22) Filed: Dec. 22, 2006

(65) Prior Publication Data

US 2008/0153972 A1    Jun. 26, 2008

(51) Int. Cl.
*C08G 73/10* (2006.01)
(52) U.S. Cl. .................................... 524/104; 525/327.4
(58) Field of Classification Search ................. 524/516, 524/104; 525/327.4
See application file for complete search history.

(56) References Cited

U.S. PATENT DOCUMENTS

| | | | |
|---|---|---|---|
| 3,018,291 A | 1/1962 | Anderson et al. | |
| 3,024,237 A | 3/1962 | Drummond et al. | |
| 3,172,892 A | 3/1965 | Le Suer et al. | |
| 3,219,666 A | 11/1965 | Norman et al. | |
| 3,223,495 A | 12/1965 | Calvino et al. | |
| 3,272,746 A | 9/1966 | Le Suer et al. | |
| 3,361,673 A | 1/1968 | Stuart et al. | |
| 3,367,864 A | 2/1968 | Elliott et al. | |
| 3,443,918 A | 5/1969 | Kautsky et al. | |
| 3,461,108 A | 8/1969 | Heilman et al. | |
| 3,560,455 A | 2/1971 | Hazen et al. | |
| 3,560,456 A | 2/1971 | Hazen et al. | |
| 3,560,457 A | 2/1971 | Hazen et al. | |
| 3,580,893 A | 5/1971 | Heilman | |
| 3,706,704 A | 12/1972 | Heilman | |
| 3,729,450 A | 4/1973 | Galiano et al. | |
| 3,729,451 A | 4/1973 | Blecke et al. | |
| 3,912,764 A | 10/1975 | Palmer, Jr. | |
| 3,944,552 A | 3/1976 | Lawrence | |
| 4,152,499 A | 5/1979 | Boerzel et al. | |
| 4,234,435 A | 11/1980 | Meinhardt et al. | |
| 4,322,336 A | 3/1982 | Machurat et al. | |
| 4,446,281 A | 5/1984 | Takamatsu et al. | |
| 4,910,267 A * | 3/1990 | Oyama et al. ............... 525/352 |
| 5,112,507 A | 5/1992 | Harrison | |
| 5,137,978 A | 8/1992 | Degonia et al. | |
| 5,137,980 A | 8/1992 | DeGonia et al. | |
| 5,150,754 A | 9/1992 | Phelps et al. | |
| 5,175,225 A | 12/1992 | Ruhe, Jr. | |
| 5,286,799 A | 2/1994 | Harrison et al. | |
| 5,319,030 A | 6/1994 | Harrison et al. | |
| 5,393,309 A | 2/1995 | Cherpeck | |
| 5,523,417 A | 6/1996 | Blackborow et al. | |
| 5,565,528 A | 10/1996 | Harrison et al. | |
| 5,616,668 A | 4/1997 | Harrison et al. | |
| 5,625,004 A | 4/1997 | Harrison et al. | |
| 5,777,025 A | 7/1998 | Spencer et al. | |
| 5,792,729 A | 8/1998 | Harrison et al. | |
| 5,922,792 A | 7/1999 | Wideman et al. | |
| 5,981,662 A | 11/1999 | D'Sidocky et al. | |
| 6,133,354 A | 10/2000 | Wang et al. | |
| 6,174,989 B1 | 1/2001 | D'Sidocky et al. | |
| 6,204,354 B1 | 3/2001 | Wang et al. | |
| 6,207,763 B1 | 3/2001 | Wang et al. | |
| 6,350,800 B1 | 2/2002 | Wang et al. | |
| 6,353,054 B1 | 3/2002 | Wang et al. | |
| 6,359,064 B1 | 3/2002 | Wang et al. | |
| 6,369,166 B1 | 4/2002 | Wang et al. | |
| 6,372,855 B1 | 4/2002 | Chino et al. | |
| 6,384,134 B1 | 5/2002 | Hall et al. | |
| 6,401,776 B1 | 6/2002 | Wang et al. | |
| 6,403,724 B1 | 6/2002 | Wang | |
| 6,417,259 B1 | 7/2002 | Wang et al. | |
| 6,458,881 B1 | 10/2002 | Pan et al. | |
| 6,632,781 B2 | 10/2003 | Harrison et al. | |

(Continued)

FOREIGN PATENT DOCUMENTS

EP    0355895    2/1990

(Continued)

OTHER PUBLICATIONS

Bauer, Walter H. et al.,. "Flow Properties and Structure of Peptized Aluminum Soap-Hydrocarbon Gels", J. Phys. Chem., vol. 62, pp. 106-110 [Jan. 1958].

Bauer, Walter H. et al., "Entrance Effects in Capillary Flow of Aluminum Dilaurate-Toluene Gels", J. Phys. Chem., vol. 62, pp. 1245-1247 [Oct. 1958].

Gaskins, Frederick H. et al., "Rheology of Aluminum Dilaurate in Toluene", Transactions of the Society of Rheology, vol. 13, No. 1, pp. 17-38 [1969].

(Continued)

*Primary Examiner*—Timothy J. Kugel
*Assistant Examiner*—Atnaf Admasu
(74) *Attorney, Agent, or Firm*—Meredith E. Hooker; Nathan Lewis

(57) ABSTRACT

A reduced oil rubber composition includes (a) a silica filler, (b) a N-substituted polyalkylene succinimide derivative, and (c) a rubber matrix. In certain embodiments, the composition may comprise a reduced amount of oil, especially a reduced amount of aromatic oil or even no aromatic oil. Rubber articles manufactured from such composition, such as tires and power belts, have improved properties such as reduced rolling resistance, improved wet/snow traction and winter softness, improved dynamic stiffness, improved tensile strength, easy handling, and/or compatibility with higher environmental standard, among others.

17 Claims, 8 Drawing Sheets

U.S. PATENT DOCUMENTS

| | | |
|---|---|---|
| 6,699,813 B2 | 3/2004 | Luo et al. |
| 6,706,823 B2 | 3/2004 | Wang et al. |
| 7,429,393 B2 | 9/2008 | Wang et al. |
| 2002/0188064 A1 | 12/2002 | Wang et al. |
| 2003/0130398 A1 | 7/2003 | Wang |
| 2003/0130401 A1 | 7/2003 | Lin et al. |
| 2005/0022915 A1 | 2/2005 | Bowen, III et al. |
| 2008/0153972 A1 | 6/2008 | Wang et al. |

FOREIGN PATENT DOCUMENTS

| | | |
|---|---|---|
| EP | 0542380 | 5/1993 |
| EP | 0602863 | 6/1994 |
| EP | 1270657 | 1/2003 |
| WO | 2004/058874 | 7/2004 |

OTHER PUBLICATIONS

Harple, Warren W. et al., "Infrared Absorption Spectra of Aluminum Soaps", Analytical Chemistry, vol. 24, No. 4, pp. 635-638 [Apr. 1952].

Ludke, Willard O. et al., "Mechanism of Peptization of Aluminum Soap-Hydrocarbon Gels Based Upon Infrared Studies", J. Phys. Chem., vol. 59, pp. 222-225 [Mar. 1955].

McGee, Charles G., "Aluminum Monolaurate and Proposed Structures for Aluminum Soaps", Am. Chem. Soc., vol. 71, pp. 278-282 [Jan. 1949].

Mysels, Karol J., "Studies of Aluminum Soaps: IX. Electron Microscope View of Lyophilized Aluminum Laurate", The Journal of General Physiology, pp. 159-161 [Jul. 15, 1946].

Weber, Neill et al., "Flow Properties of Aluminum Dilaurate-Toluene Gels", J. Phys. Chem., vol. 60, pp. 270-273 [Mar. 1956].

Weill, J. et al., "Reaction du Polyisobutene Chlore Sur L'Anhydride Maleique: Mecanisme; Catalyse Par L'Anhydride Dichloromaleique", Revue de L'Institut Francais due Petrole, vol. 40, No. 1, pp. 77-89 [Jan.-Feb. 1985].

Trappe, V. et al., "Scaling of the Viscoelasticity of Weakly Attractive Particles", Physical Review Letters, vol. 85, No. 2, pp. 449-452 (Jul. 10, 2000).

Scott, Angela C., Office Action dated Nov. 28, 2007 from U.S. Appl. No. 11/646,981 (7 pp.).

Scott, Angela C., Final Office Action dated Jun. 9, 2008 from U.S. Appl. No. 11/646,981 (6 pp.).

Scott, Angela C., Office Action dated Nov. 24, 2008 from U.S. Appl. No. 11/646,981 (5 pp.).

Scott, Angela C., Office Action dated Jul. 7, 2009 from U.S. Appl. No. 11/646,981 (6 pp.).

* cited by examiner

REDUCED OIL RUBBER COMPOSITIONS INCLUDING N-SUBSTITUTED POLYALKYLENE SUCCINIMIDE DERIVATES AND METHODS FOR PREPARING SUCH COMPOSITIONS

FIELD AND BACKGROUND

The present disclosure is generally related to a rubber composition. More particularly, the present disclosure is related to a rubber composition comprising a silica filler, and a N-substituted polyalkylene succinimide derivative. The addition of the N-substituted polyalkylene succinimide derivative allows for a reduction in the amount of processing oil required in the rubber composition. The composition is useful in manufacturing rubber articles such as tires with reduced rolling resistance, improved wet/snow traction and winter softness, improved dynamic stiffness, improved tensile strength, easy handling, and/or compatibility with higher environmental standard, among others.

Various imide compounds have been used in rubber compounding. For example, U.S. Pat. No. 4,322,336 to Machurat et al. teaches that a minor amount of an alkenyl succinimide may be incorporated into a filled/plasticized natural or synthetic rubber, to enhance the compatibility between reinforcing filler such as silica and plasticizer such as oil. The alkenyl succinimides were prepared by reacting anhydrides such as tetrapropenyl succinic anhydride and polyisobutenyl succinic anhydride with amines including tris(3-oxa-6-aminohexyl) amine, 1-10-diamino-4,7-dioxadecane, ethylene diamine, para diamino benzene, bis-hexamethylene triamine, and tetraethylene pentamine.

U.S. Pat. No. 3,944,552 to Lawrence discloses some imide compounds in rubber composition such as N-(morpholinothio)-succinimide, N-(piperidinothio)-succinimide, N-(morpholinothio)-maleimide, N-(dibenzylaminothio)-maleimide, N-(morpholinothio)-glutarimide, and N-(2,6-dimethylmorpholinothio)-glutarimide. The imide compounds are used as sulfur donors to increase the state of vulcanization or to permit the use of lesser amounts of free sulfur.

U.S. Pat. No. 5,922,792 to Wideman et al. discloses a rubber composition comprising from 0.1 to 10 phr of a sulfur containing bis-succinimide of the formula:

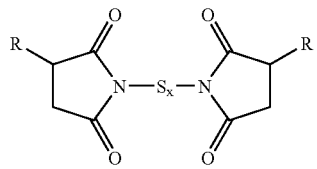

wherein R is selected from the group consisting of hydrogen and alkyls having from 1 to 18 carbon atoms and x is an integer of from 1 to 8. In exemplified embodiments, tetrathiodisuccinimide was prepared from the reaction between N-chlorosuccinimide and red-colored tetrasulfide dianion, which was formed by mixing sodium sulfide nonahydrate and sulfur in distilled water at elevated temperature. The use of sulfur containing bis-succinimide with a silica coupler resulted in higher modulus, E' (stiffness), hardness properties (at room temperature) and rebound values.

U.S. Pat. Nos. 5,981,662 and 6,174,989, both to D'Sidocky et al., disclose some rubber compounds containing polymeric bis-succinimide polysulfides such as poly N,N'-m-Xylylenebis(3-methylsuccinimide)polysulfide. Rubber compounding results showed improvements in retention of modulus during overcure and with increasing cure temperature, improvements in retention of tensile strength, improvements in retention of hardness and improvements in retention of rebound properties.

U.S. Pat. No. 6,632,781 to Harrison et al. discloses a lubricant composition comprising an alkali metal borate dispersed in a polyalkylene succinic anhydride and a metal salt of a polyisobutenyl sulfonate. The polyalkylene succinic anhydride is selected from polyalkylene succinic anhydride, non-nitrogen containing derivatives of polyalkylene succinic anhydride, and mixtures thereof. The lubricant composition is described as useful in high load conditions such as occur in the gears of automobile transmission and differentials.

U.S. Pat. No. 5,393,309 to Cherpeck discloses the use of a polyisobutenyl succinimide derivative in combination with a nonvolatile paraffinic or naphthenic carrier oil as a fuel additive. The derivative is prepared by reacting ethylenediamine or diethylenetriamine with a polyisobutenyl succinic anhydride.

The technology described herein provides a new class of N-substituted polyalkylene succinimide derivative used together with silica filler in rubber compositions. Rubber articles such as tires made from such composition can exhibit unexpected properties such as reduced rolling resistance, improved wet/snow traction and winter softness, improved dynamic stiffness, improved tensile strength, easy handling, and/or compatibility with higher environmental standard, among others.

SUMMARY

In one example a composition comprises (a) a silica filler, (b) a N-substituted polyalkylene succinimide derivative, and (c) a rubber matrix.

Another example provides a composition comprising (a) a silica filler, (b) a N-substituted polyalkylene succinimide derivative, (c) a rubber matrix, (d) an optional oil, and (e) one or more components selected from the group consisting of carbon black, vulcanizing agent, vulcanization accelerator, tackifier resin, antioxidant, fatty acids, zinc oxide, wax, peptizer, vulcanization retarder, activator, processing additive, plasticizer, pigments, and antiozonant.

Still another example provides rubber articles manufactured from a composition comprising (a) a silica filler, (b) a N-substituted polyalkylene succinimide derivative, (c) a rubber matrix, (d) an optional oil, and (e) one or more components selected from the group consisting of carbon black, vulcanizing agent, vulcanization accelerator, tackifier resin, antioxidant, fatty acids, zinc oxide, wax, peptizer, vulcanization retarder, activator, processing additive, plasticizer, pigments, and antiozonant.

BRIEF DESCRIPTION OF THE DRAWINGS

The drawings are only for purposes of illustrating preferred embodiments and are not to be construed as limiting the invention. In the drawings appended hereto.

DETAILED DESCRIPTION OF ILLUSTRATIVE EMBODIMENTS

Figure 1:
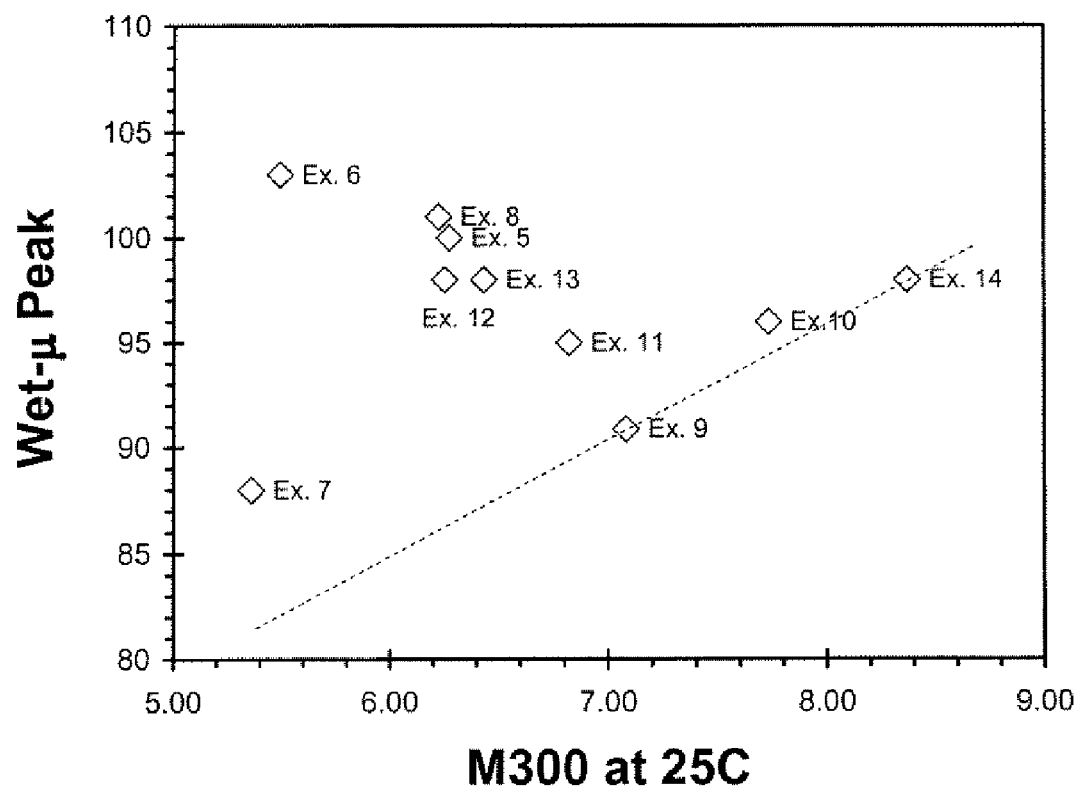
FIG. 1 shows the Wet-μ Peak values and M300 at 25° C. values of the rubber samples in an example.

It is to be understood herein, that if a "range" or "group" is mentioned with respect to a particular characteristic of the present invention, for example, molecular weight, ratio, percentage, chemical group, and temperature etc., it relates to and explicitly incorporates herein each and every specific member and combination of subranges or sub-groups therein whatsoever. Thus, any specified range or group is to be understood as a shorthand way of referring to each and every member of a range or group individually as well as each and every possible sub-range or sub-group encompassed therein; and similarly with respect to any sub-ranges or sub-groups therein.

As will be used in this description, the term "phr" refers to "parts by weight of a respective material per 100 parts by weight of the rubber matrix". The term "PIBSA" is an abbreviation for polyisobutenyl succinic anhydride. All cited patents and publications in the description are incorporated herein by reference in their entireties.

The N-substituted polyalkylene succinimide derivative described herein generally comprises a polyalkylene group, and from 1 to 2, preferably from 1 to 1.3 succinimide groups per polyalkylene group. In embodiments, the N-substituted polyalkylene succinimide derivative comprises one succinimide group per polyalkylene group.

In embodiments, the N-substituted polyalkylene succinimide have the general formula (I)

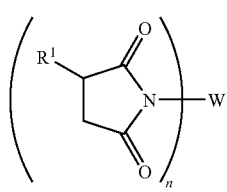
(I)

wherein $R^1$ is a polyalkylene group, n is 1 or 2, and W is a group containing N, Si, O, and combination thereof.

In embodiments, the N-substituted polyalkylene succinimide may be selected from the group consisting of compounds with formulas (Ia), (Ib), (Ic), (Id), and any combination thereof:

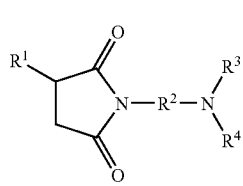
(Ia)

wherein $R^1$ is a polyalkylene group, $R^2$ is a $C_1$-$C_{10}$ alkylene group, $R^3$ is a $C_1$-$C_6$ alkyl group, and $R^4$ is a $C_1$-$C_6$ alkyl group;

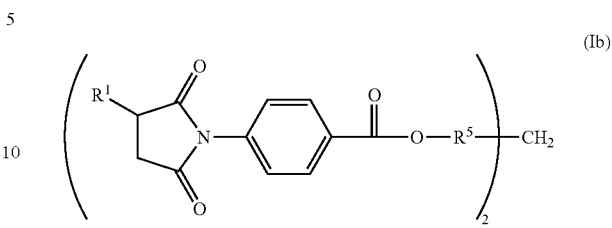
(Ib)

wherein $R^1$ is a polyalkylene group, and $R^5$ is a $C_1$-$C_4$ alkylene group;

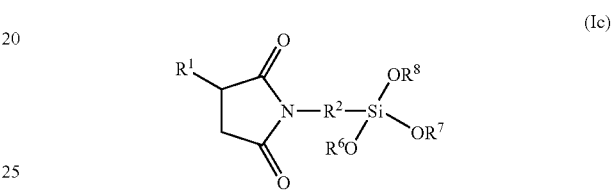
(Ic)

wherein $R^1$ is a polyalkylene group, $R^2$ is a $C_1$-$C_{10}$ alkylene group, $R^6$ is a $C_1$-$C_6$ alkyl group, $R^7$ is a $C_1$-$C_6$ alkyl group, and $R^8$ is a $C_1$-$C_6$ alkyl group; and

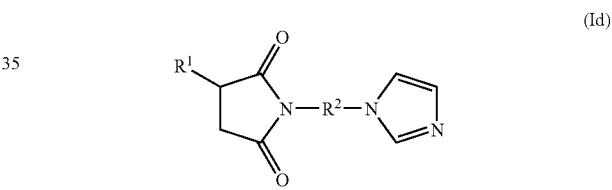
(Id)

wherein $R^1$ is a polyalkylene group, and $R^2$ is a $C_1$-$C_{10}$ alkylene group.

In some examples, the polyalkylene group $R^1$ is a polyisobutene group. The polyisobutene group generally comprises from about 4 to about 2,000,000, preferably from about 8 to about 100,000, and more preferably from about 16 to about 10,000 carbon atoms and even more preferably from about 16 to about 64 carbon atoms.

In an embodiment, the polyalkylene group $R^1$ is a polyisobutene group as shown below:

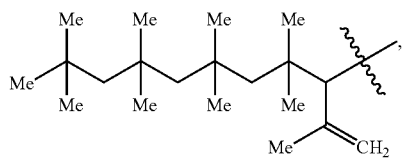

wherein Me represents methyl group.

The N-substituted polyalkylene succinimide of formula (I) may be prepared from the reaction between a suitable amine or diamine compound and a polyalkylene succinic anhydride, as shown below:

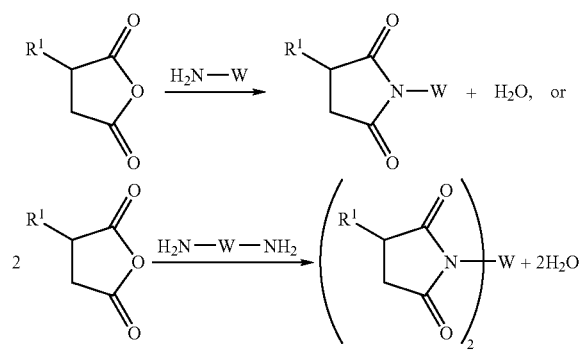

wherein $R^1$ is a polyalkylene group, and W is a group containing nitrogen, silicon, and/or oxygen.

When the N-substituted polyalkylene succinimide meets the formula (Ia) above, a suitable amine for reaction with a polyalkylene succinic anhydride is of the formula $NH_2$—$R^2$—N—$(R^3)(R^4)$, where $R^2$ is a $C_1$-$C_{10}$ alkylene group, $R^3$ is a $C_1$-$C_6$ alkyl group, and $R^4$ is a $C_1$-$C_6$ alkyl group. When the N-substituted polyalkylene succinimide meets the formula (Ib) above, a suitable amine for reaction with a polyalkylene succinic anhydride is of the formula $(NH_2$-phenyl-$(C=O)$O—$R^5)_2CH_2$ where $R^5$ is a $C_1$-$C_4$ alkylene group. When the N-substituted polyalkylene succinimide meets the formula (Ic) above, a suitable amine for reaction with a polyalkylene succinic anhydride is of the formula $NH_2$—$R^2$—Si—$(OR^6)(OR^7)(OR^8)$, where $R^2$ is a $C_1$-$C_{10}$ alkylene group, $R^6$ is a $C_1$-$C_6$ alkyl group, $R^7$ is a $C_1$-$C_6$ alkyl group, and $R^8$ is a $C_1$-$C_6$ alkyl group. When the N-substituted polyalkylene succinimide meets the formula (Id) above, a suitable amine for reaction with a polyalkylene succinic anhydride is of the formula $NH_2$—$R^2$-imidazole, where $R^2$ is a $C_1$-$C_{10}$ alkylene group and imidazole is $C_3H_3N_2$ (a heterocyclic, five membered aromatic ring compound).

In an embodiment, the N-substituted polyalkylene succinic anhydride may be prepared from the reaction between a polyalkylene, preferably polyisobutene, with maleic anhydride. Polyisobutenes can be obtained according to known methods by cationic polymerization of isobutene, where a double bond remains in the last monomer unit incorporated after termination of the polymer chain, as described in DE-A 27 02 604 and EP-A 0 145 235. Polyisobutenes from a $BF_3$ catalyzed polymerization as described in EP-A 0 628 575 can also be used. These polyisobutenes contain a high proportion of vinylidene (—$C(CH_3)=CH_2$) and dimethylvinyl (—$CH=C(CH_3)_2$) end groups. Polyisobutenes having terminal unsaturation can also be prepared by living cationic polymerization of isobutene, as described, for example, in "Carbocationic Macromolecular Engineering", Kennedy and Ivan, Hauser Publishers, 1992, or EP-A 713 883. The polymerization is in this case initiated by suitable initiator molecules (inifers), in general organic tertiary halides such as meta- or para-dicumyl chloride, and a Lewis acid such as titanium tetrachloride. The halogen-terminated polymer formed can be dehydrohalogenated by treatment with a base such as potassium tert-butoxide or by thermal treatment, forming vinylidene groups (—$CH_2$—$C(CH_3)=CH_2$) at the ends of the molecules. As an alternative, the halogen-terminated polymer can be treated with allyltrimethylsilane, as a result of which the ends of the molecules become terminated by allyl groups (—$CH_2$—$CH=CH_2$), as described in EP-A 264 214. The initiator can be selected so that polymer chains grow in one direction or more than one direction by addition of isobutene molecules, resulting in linear or star-shaped polymers.

In various embodiments, one can use conventional polyisobutene, or high methylvinylidene polyisobutene in the preparation of polyalkylene succinic anhydrides. One can use thermal, chlorination, free radical, acid catalyzed, or any other process in this preparation. Examples of suitable polyalkylene succinic anhydrides are thermal PIBSA (polyisobutenyl succinic anhydride) described in U.S. Pat. No. 3,361,673; chlorination PIBSA described in U.S. Pat. No. 3,172,892; a mixture of thermal and chlorination PIBSA described in U.S. Pat. No. 3,912,764; high succinic ratio PIBSA described in U.S. Pat. No. 4,234,435; PolyPIBSA described in U.S. Pat. Nos. 5,112,507 and 5,175,225; high succinic ratio PolyPIBSA described in U.S. Pat. Nos. 5,565,528 and 5,616,668; free radical PIBSA described in U.S. Pat. Nos. 5,286,799, 5,319,030, and 5,625,004; PIBSA made from high methylvinylidene polybutene described in U.S. Pat. Nos. 4,152,499, 5,137,978, and 5,137,980; high succinic ratio PIBSA made from high methylvinylidene polybutene described in European Patent Application Publication EP 355 895; terpolymer PIBSA described in U.S. Pat. No. 5,792,729; sulfonic acid PIBSA described in U.S. Pat. No. 5,777,025 and European Patent Application Publication No. EP 542 380; and purified PIBSA described in U.S. Pat. No. 5,523,417 and European Patent Application Publication EP 602 863.

In embodiments, the polyalkylene succinic anhydride may also be selected from copolymers of an olefin with an unsaturated acidic reactant which are well known in the art, for example, U.S. Pat. Nos. 3,461,108; 3,560,455; 3,560,456; 3,560,457; 3,580,893; 3,706,704; 3,729,450; 3,729,451; and 5,112,507.

PIBSA produced by the thermal process has been characterized as a monomer containing a double bond in the product. The chlorination process Pisa's have been characterized as monomers containing either a double bond, a ring, other than a succinic anhydride ring and/or chlorine in the product. [See J. Weill and B. Sillion, "Reaction of Chlorinated Polyisobutene with Maleic Anhydride: Mechanism Catalysis by Dichloromaleic Anhydride", Revue de l'Institut Francais du Petrole, Vol. 40, No. 1, pp. 77-89 (January-February, 1985).]

Reaction of polyalkenes, such as polyisobutenes, with maleic anhydride, in the presence of a free radical initiator, can result in a product similar to that produced by the thermal process for PIBSA which is a monomeric one-to-one adduct, as described in, for example, U.S. Pat. No. 3,367,864.

Polyalkylene succinic anhydride may also be commercially obtained. For example, PIBSA under the trade name OLOA 15500 can be obtained from Chevron Oronite Company LLC, 1301 McKinney Street, Houston, Tex. 77010 U.S.A. OLOA 15500 is derived from 1000 molecular weight polybutene, and may be produced via a thermal process. The PIBSA Number of OLOA 15500 is 92 as measured with OPM 556.

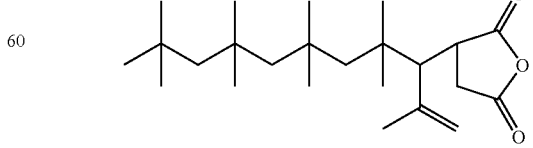

OLOA 15500

Suitable amine compounds may contain one or more primary amine groups, and the compounds may be used to prepare mono-(polyalkylene succinimide), bis(polyalkylene succinimide), tris-(polyalkylene succinimide), and the like, and mixtures thereof. Examples of suitable amine compounds include, but are not limited to, tertiary-aminoalkyl mono-amine such as 3-(dimethylamino)propylamine, alkylene glycol di-aminobenzoate such as trimethylene glycol di-p-aminobenzoate, aminoalkyl trialkoxysilane such as 3-aminopropyltriethoxysilane, aminoalkylimidazole such as 1-(3-aminopropyl)imidazole, and the combination thereof.

In exemplified embodiments, the N-substituted polyalkylene succinimide derivatives were prepared from the reactions between PIBSA (OLOA 15500) and a suitable amine such as 3-(dimethylamineo)propylamine, trimethylene glycol di-p-aminobenzoate, 3-aminopropyltriethoxysilane, and 1-(3-aminopropyl)imidazole.

In an embodiment, the N-substituted polyalkylene succinimide has formula (Ia-1) as shown below:

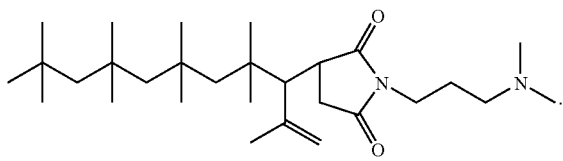

(Ia-1)

In an embodiment, the N-substituted polyalkylene succinimide has formula (Ib-1) as shown below:

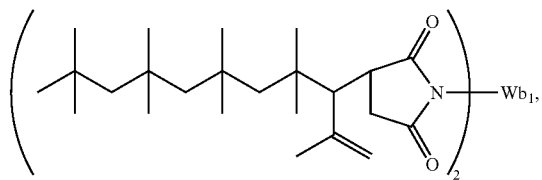

(Ib-1)

wherein -Wb1- is:

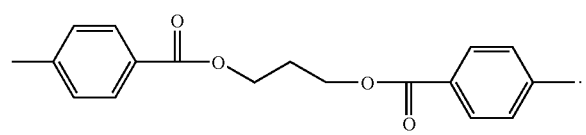

In an embodiment, the N-substituted polyalkylene succinimide has formula (Ic-1) as shown below:

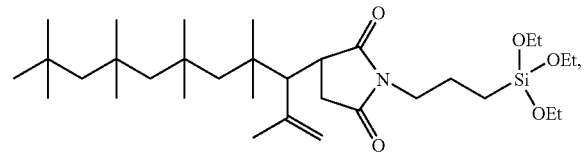

(Ic-1)

wherein Et represents ethyl group.

In an embodiment, the N-substituted polyalkylene succinimide has formula (Id-1) as shown below:

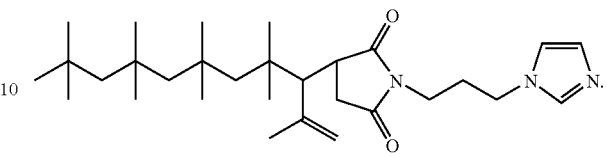

(Id-1)

The preparation of N-substituted polyalkylene succinimide is similar to the reaction of a polyamine with an alkenyl or alkyl succinic anhydride as described, for example, in U.S. Pat. Nos. 3,018,291; 3,024,237; 3,172,892; 3,219,666; 3,223,495; 3,272,746; 3,361,673 and 3,443,918.

The reaction between PIBSA and suitable amines can be carried out at a temperature ranging from about 0° C. to about 300° C., for a period from about 48 hours to about 0.5 hour. Then, the reaction mixture may be placed in a vacuum oven at from about 25° C. to about 200° C. to dehydrate for about 1 hour to about 1 month.

Typical amount of the polyalkylene succinimide derivative in the composition may broadly range from about 0.1 phr to about 100 phr, from about 1 phr to about 80 phr, or from about 15 phr to about 30 phr, based on 100 phr rubbery matrix in the composition.

The rubbery matrix may comprise any solution polymerizable or emulsion polymerizable elastomer, for example, diene homopolymers, and copolymers and terpolymers of conjugated diene monomers with vinyl aromatic monomers and trienes such as myrcene. Exemplary diene homopolymers are those prepared from diolefin monomers having from 4 to about 12 carbon atoms. Exemplary vinyl aromatic polymers are those prepared from monomers having from 8 to about 20 carbon atoms.

Specific examples of suitable diene monomers include, but are not limited to, 1,3-butadiene, isoprene (2-methyl-1,3-butadiene), cis- and trans-piperylene (1,3-pentadiene), 2,3-dimethyl-1,3-butadiene, 1,3-pentadiene, cis- and trans-1,3-hexadiene, cis- and trans-2-methyl-1,3-pentadiene, cis- and trans-3-methyl-1,3-pentadiene, 4-methyl-1,3-pentadiene, 2,4-dimethyl-1,3-pentadiene, and the like, and the mixture thereof. In preferred embodiments, isoprene or 1,3-butadiene or mixture thereof is used as the shell monomer.

Any compound that comprises one vinyl group and an aromatic group may be used as the mono-vinyl aromatic monomer. Suitable mono-vinyl aromatic monomers include, but are not limited to styrene, ethylvinylbenzene, α-methylstyrene, 1-vinyl naphthalene, 2-vinyl naphthalene, vinyl toluene, methoxystyrene, t-butoxystyrene, and the like; as well as alkyl, cycloalkyl, aryl, alkaryl, and aralkyl derivatives thereof in which the total number of carbon atoms in the monomer is generally not greater than about 18; and mixtures thereof. In exemplified embodiments, the mono-vinyl aromatic monomer comprises styrene.

In certain exemplary embodiments, the conjugated diene monomer and vinyl aromatic monomer are normally used at the weight ratios of about 1:99 to about 99:1, or about 15:85 to about 85:15. The rubbery matrix can have 1,2-microstructure contents ranging from about 1 percent to about 99 percent, or polymers, copolymers or terpolymers having 1,2-microstructure content of from about 1 to 99 percent, based upon the diene content of the rubbery matrix. The copolymers are preferably random copolymers which result from simultaneous copolymerization of the monomers with randomizing agents, as is known in the art.

The rubber matrix may comprise well-known rubbers such as natural rubber, synthetic rubber and blends thereof. Such rubbers are well known to those skilled in the art and include synthetic polyisoprene rubber, styrene-butadiene rubber (SBR), styrene-isoprene-butadiene rubber, styrene-isoprene rubber, butadiene-isoprene rubber, polybutadiene, butyl rubber, neoprene, ethylene-propylene rubber, ethylene-propylene-diene rubber (EPDM), acrylonitrile-butadiene rubber (NBR), silicone rubber, the fluoroelastomers, ethylene acrylic rubber, ethylene vinyl acetate copolymer (EVA), epichlorohydrin rubbers, chlorinated polyethylene rubbers, chlorosulfonated polyethylene rubbers, hydrogenated nitrile rubber, tetrafluoroethylene-propylene rubber, and the like, and the mixture thereof.

The rubber matrix used in tires, hoses, power transmission belts and other industrial products has good compatibility with fillers, such as carbon black and silica. To attain improved interaction with fillers, the rubbery matrix can be functionalized with various compounds, such as amines.

A rubber matrix such as diene polymer may be prepared and recovered according to various suitable methods such as batch, semi-continuous, or continuous operations. The polymerization can also be carried out in a number of different polymerization reactor systems, including but not limited to bulk polymerization, vapor phase polymerization, solution polymerization, suspension polymerization, coordination polymerization and emulsion polymerization. The polymerization may be carried out using free radical mechanism, anionic mechanism, or cationic mechanism. An exemplary method of polymerization is emulsion polymerization with commonly used free radical initiators.

Exemplary free radical initiators include the various peroxygen compounds such as potassium persulfate, ammonium persulfate, benzoyl peroxide, hydrogen peroxide, di-t-butyl peroxide, dicumyl peroxide, 2,4-dichlorobenzoyl peroxide, decanoyl peroxide, lauryl peroxide, cumene hydroperoxide, p-menthane hydroperoxide, t-butyl hydroperoxide, acetyl acetone peroxide, dicetyl peroxydicarbonate, t-butyl peroxyacetate, t-butyl peroxymaleic acid, t-butyl peroxybenzoate, acetyl cyclohexyl sulfonyl peroxide, and the like; the various azo compounds such as 2-t-butylazo-2-cyanopropane, dimethyl azodiisobutyrate, azodiisobutyronitrile, 2-t-butylazo-1-cyanocyclo-hexane, 1-t-amylazo-1-cyanocyclohexane, and the like; the various alkyl perketals, such as 2,2-bis-(t-butylperoxy)butane, ethyl 3,3-bis(t-butylperoxy)butyrate, 1,1-di-(t-butylperoxy)cyclohexane, and the like. Persulfate initiators, such as potassium persulfate and ammonium persulfate, are especially useful in aqueous emulsion polymerizations.

Of course, the polymerization may also be carried out with free radicals that are generated utilizing redox initiators, such as combinations of chelated iron salts, sodium formaldehyde sulfoxylate, and organic hydroperoxides. Some representative examples of such organic hydroperoxides include cumene hydroperoxide, paramenthane hydroperoxide, and tertiary butyl hydroperoxide.

The amount of initiator employed will vary with the desired molecular weight of the rubbery matrix polymer being synthesized. Higher molecular weights are achieved by utilizing smaller quantities of the initiator and lower molecular weights are attained by employing larger quantities of the initiator. The molecular weight of the rubbery polymer produced is, of course, also dependent upon the amount of chain transfer agent, such as t-dodecyl mercaptan, present during the polymerization. For instance, low molecular weight rubbery polymers can be synthesized by simply increasing the level of chain transfer agent.

The invention is not limited by the type of reaction procedure and system used. For example, in batch operations, the polymerization time of diene monomers can be varied as desired; it may vary, for example, from a few minutes to several days. Polymerization in batch processes may be terminated when the monomer is no longer absorbed, or earlier, if desired, e.g., if the reaction mixture becomes too viscous. In continuous operations, the polymerization mixture may be passed through a reactor of any suitable design. The polymerization reactions in such cases are suitably adjusted by varying the residence time. Residence times may range, for example, from 10 to 15 minutes to 24 or more hours.

Optionally, other vinyl comonomers that can potentially be polymerized into the rubbery matrix of the composition may be used. Such comonomers include, but are not limited to, alkyl(meth)acrylates, such as methyl acrylate, ethyl acrylate, butyl acrylate, methyl methacrylate and the like; α-olefins such as ethylene, propylene, 1-butene and the like; vinyl halides, such as vinylbromide, chloroethene (vinylchloride), vinylfluoride, vinyliodide, 1,2-dibromoethene, 1,1-dichloroethene (vinylidene chloride), 1,2-dichloroethene and the like; vinyl esters, such as vinyl acetate; α,β-olefinically unsaturated nitriles, such as acrylonitrile and methacrylonitrile; α,β-olefinically unsaturated amides, such as acrylamide, N-methyl acrylamide, N,N-dimethylacrylamide, methacrylamide; vinylpyridine, methacrylic acid, itaconic acid, acrylic acid, and the like, and the mixture thereof.

For anionic polymerization, quenching of the reaction with a functional terminating agent provides a way of functionalization of the rubbery matrix. Any compounds providing terminal functionality (i.e., endcapping) that are reactive with the polymer bound carbon-lithium moiety can be selected to provide a desired functional group. Exemplary compounds include ketimines, Michler's ketone, 1,3-dimethyl-2-imidazolidinone, 1-alkyl substituted pyrrolidinones, 1-aryl substituted pyrrolidinones, tin tetrachloride, tributyl tin chloride, carbon dioxide, and the like, and the mixtures thereof. Further examples of reactive compounds include the terminators described in U.S. Pat. Nos. 5,521,309 and 5,066,729, the subject matter of which, pertaining to terminating agents and terminating reactions, is hereby incorporated by reference. Other useful terminating agents can include those of the structural formula $(R)_aZX_b$, where Z is tin or silicon. It is preferred that Z is tin. R is one or more hydroxyl groups; an alkyl having from about 1 to about 20 carbon atoms; a cycloalkyl having from about 3 to about 20 carbon atoms; an aryl having from about 6 to about 20 carbon atoms, or an aralkyl having from about 7 to about 20 carbon atoms. For example, R can include methyl, ethyl, n-butyl, neophyl, phenyl, cyclohexyl or the like. X is a halogen, such as chlorine or bromine, or —OH or alkoxy (—OR), "a" is an integer from 0 to 3, and "b" is an integer from 1 to 4, where a+b=4. Examples of such terminating agents include tin tetrachloride, tributyl tin chloride, butyl tin trichloride, butyl silicon trichloride, as well as tetraethoxysilane, $Si(OEt)_4$, and methyl triphenoxysilane, $MeSi(OPh)_3$. The practice of the present invention is not limited solely to these terminators, since other compounds that are reactive with the polymer bound carbon-lithium moiety can be selected to provide a desired functional group.

While terminating to provide a functional group on the terminal end of the polymer is one preferred embodiment, another preferred embodiment is to terminate by a coupling reaction with, for example, tin tetrachloride or other coupling agent such as silicon tetrachloride or esters. High levels of tin coupling are desirable in order to maintain good processability in the subsequent manufacturing of rubber products.

In an exemplified embodiment, the rubber matrix comprises a SBR rubber under the trade name HX263 available from Firestone Synthetic (Akron, Ohio). HX263 was solution polymerized with 23.5% styrene. The product has a Mooney viscosity of 55 at 100° C., and 11% vinyl content.

Oil has been conventionally used as a compounding and processing aid in rubber compositions. For example, high levels of aromatic processing oils are often included in tire tread formulations to increase dry traction characteristics, as described in e.g. U.S. Pat. No. 4,861,131; however, the aromatic oils can reduce the durability of the tire. An advantage of the technology described herein is that it may be used to reduce the use of aromatic oils in the rubbery matrix composition.

Examples of oils useful in the rubber compositions described herein include, but are not limited to, aromatic, naphthenic, and/or paraffinic hydrocarbons extracted from certain petroleum fractions. Other useful oils include those containing less than 3 wt % of polycyclic aromatic compounds (as measured by IP346) ("low PCA oils"). Such low PCA oils are increasingly used in an effort to reduce the amount of polycyclic aromatic compounds present in rubbers used in tires. Commercially available low PCA oils include various naphthenic oils, mild extraction solvates (MES) and treated distillate aromatic extracts (TDAE). In a variety of exemplary embodiments, the polyalkylene succinimide derivative is used along with the oil, or is used to replace a portion of the oil, or is used to replace the entirety of the oil. As such, typical amounts of oil may broadly range from about 0 phr to about 100 phr, from about 0 phr to about 50 phr, or from about greater than 0 phr to about 25 phr, or in some instances less than 20 phr, based on 100 phr rubbery matrix in the composition. However, the total amount of the polyalkylene succinimide derivative and the oil should be controlled within the range of from about 1 phr to about 200 phr, preferably from about 1 phr to about 100 phr, and more preferably from about 5 phr to about 50 phr, based on 100 phr rubbery matrix of the composition.

In exemplified embodiments, an aromatic oil commercially available under the trade name of Mobilsol-90 (Mobil, Fairfax, Va.) was used in an amount of 0-15 phr, based on 100 phr rubbery matrix of the composition.

The composition disclosed herein comprises a silica filler. For example, use of amorphous precipitated silica as a reinforcing filler has resulted in tire treads having low rolling resistance, while at the same time providing high abrasion resistance. Moreover, tire treads containing silica tend to provide better braking performance on wet road surfaces. Without being bound to any particular theory, it is believed that the increased wet traction and skid resistance of silica-filled tire tread compounds is due to the polar (hydrophilic) silanol groups on the surface of the silica particles that improve the affinity between the rubber surface and the wet road surface, thereby increasing the coefficient of adhesive friction. Exemplary silica fillers include, but are not limited to, precipitated amorphous silica, wet silica (hydrated silicic acid), dry silica (anhydrous silicic acid), fumed silica, and the like. Among these, precipitated amorphous wet-process, hydrated silicas are preferred. These silicas are so-called because they are produced by a chemical reaction in water, from which they are precipitated as ultrafine, spherical particles. These primary particles strongly associate into aggregates, which in turn combine less strongly into agglomerates.

The preferred particle size for the silica is 3-500 nm, with an aggregated particle size of 10 nm to 20 µm. Silicas with other particle size can also be used.

The silica filler may be selected from any of the commonly available silicas. Some of the commercially available silicas which can be used include, but are not limited to, Hi-Sil® 190, Hi-Sil® 210, Hi-Sil® 215, Hi-Sil® 233, Hi-Sil® 243, and the like, produced by PPG Industries (Pittsburgh, Pa.). A number of useful commercial grades of different silicas are also available from Degussa Corporation (e.g., VN2, VN3), Rhone Poulenc (e.g., Zeosil® 1165 MP), and J.M. Huber Corporation.

A typical amount of silica, when used, ranges from about 5 phr to about 200 phr, preferably from about 10 phr to about 150 phr, and more preferably from about 50 phr to about 100 phr, based on 100 phr rubbery matrix in the composition.

In exemplified embodiments, a SiO filler was used in an amount of 60-80 phr, such as 70 phr, based on 100 phr rubbery matrix of the composition. The SiO filler, was a hydrated amorphous silica, purchased from PPG (Pittsburg, Pa.).

To improve filler dispersion and reduce agglomeration and re-agglomeration of silica aggregates, a coupling agent may be used along with silica fillers. Typically, a silica coupling agent has at least two functional groups, one of which is reactive with the silica surface such as a silyl group, and another one can bind to the rubbery matrix such as mercapto, amino, vinyl, epoxy or sulfur group. Exemplary coupling agents include, but are not limited to, mercaptosilanes and organosilane polysulfides having an average of from 3.5 to 4 sulfur atoms in its polysulfidic bridge. For example, bis-(3-trialkoxysilylorgano) polysulfides such as bis-(3-triethoxysilyl-propyl)tetrasulfide, which is sold commercially as Si69 by Degussa has an average of about 3.8 sulfur atoms in its polysulfidic bridge. It is envisioned that such polysulfide can be a sulfur donor, by liberating free sulfur, during typical high shear mixing of a rubber composition at an elevated temperature such as, for example, at temperatures of 100° C. and above. The small amount of free liberated sulfur may be then available to combine with and/or possibly partially vulcanize, a diene-based matrix.

In exemplified embodiments, a silane coupling agent under the trade name of Si 69 was used in an amount of 5-15 phr, such as 8 phr, based on 100 phr rubbery matrix of the composition. Si 69 is bis-(3-triethoxysilyl propyl)tertrasulfic purchased from Degussa (Parsippany, N.J.).

A silica dispersing aid such as monofunctional silica shielding agent may be used along with silica fillers. Examples of silica dispersing aid include silica hydrophobating agents that chemically react with the surface silanol groups on the silica particles but are not reactive with the matrix elastomer and agents which physically shield the silanol groups, to prevent reagglomeration (flocculation) of the silica particles after compounding. Specific examples of silica dispersing aid include alkyl alkoxysilanes, glycols (e.g., diethylene glycol or polyethylene glycol), fatty acid esters of hydrogenated and non-hydrogenated $C_5$ and $C_6$ sugars (e.g., sorbitan oleates, and the like), polyoxyethylene derivatives of the fatty acid esters, among others. Such silica dispersing aids can be used to replace all or part of expensive bifunctional silica coupling agents, while improving the processability of silica-filled rubber compounds by reducing the compound viscosity, increasing the scorch time, and reducing silica reagglomeration.

A filler and the rubbery matrix should be compatible enough so that the filler can be incorporated and dispersed into the matrix easily and uniformly while only minimally disturbing the structure of the original matrix polymer. In general terms, the effect of a filler on rubber physical properties can be related mainly to how many polymer chains are attached to the filler surface and how strongly they are attached. Fillers work differently in various polymeric systems. The characteristics which determine the properties a filler imparts to a rubber compound are particle size, surface area, structure, and surface activity. In considering fillers of adequately small particle size, reinforcement potential can be predicted from the fillers' surface area, surface activity, and persistent structure or anisometry. The general influence of each of these three filler characteristics above on rubber properties can be summarized as follows: (1) increasing surface area (decreasing particle size) gives lower resilience and higher Mooney viscosity, tensile strength, abrasion resistance, tear resistance, and hysteresis; (2) increasing surface activity (including surface treatment) gives higher abrasion resistance, chemical adsorption or reaction, modulus, and hysteresis; and (3) increasing persistent structure/anisometry gives higher Mooney viscosity, modulus, and hysteresis, lower extrusion shrinkage, tear resistance, and resilience, and longer incorporation time. Moreover, filler-filler interaction should not be so strong as to significantly increase the compound viscosity during mixing or the hardness of the finished product.

Without being bound to any particular theory, it is believed that, combination of the silica filler and the polyalkylene succinimide derivative, in the presence of zero or a minimal amount of oil, gives rise to (1) a characteristic bonding between the silica filler and polyalkylene group such as polyisobutylene in the polyalkylene succinimide derivative; (2) a characteristic suspension of filler particles in rubber matrix; and/or (3) a diversified range of interactions and structures in the rubber/silica composite. The microstructure change is reflected in the bulk properties of rubber product. Rubber articles such as tires made from such composition can exhibit unexpected properties such as reduced rolling resistance, improved wet/snow traction and winter softness, improved dynamic stiffness, improved tensile strength, easy handling, and/or compatibility with higher environmental standard, among others.

In another example, a composition comprises (a) a silica filler, (b) a polyalkylene succinimide derivative, (c) a rubber matrix, (d) an optional oil, and (e) one or more components selected from the group consisting of carbon black, vulcanizing agent, vulcanization accelerator, tackifier resin, antioxidant, fatty acids, zinc oxide, wax, peptizer, vulcanization retarder, activator, processing additive, plasticizer, pigments, and antiozonant. Various rubber products such as a tire and a power belt may be manufactured based on this composition.

The terms "rubber" and "elastomer" if used herein, may be used interchangeably, unless otherwise prescribed. The terms such as "rubber composition", "compounded rubber" and "rubber compound", if used herein, are used interchangeably to refer to "rubber which has been blended or mixed with various ingredients and materials" and "rubber compounding" or "compounding" may be used to refer to the "mixing of such materials". Such terms are well known to those having skill in the rubber mixing or rubber compounding art.

Carbon black is used as a reinforcing filler and normally provides or enhances good physical properties for sulfur cured rubber. The carbon black may be selected from any of the commonly available carbon blacks, but those having a surface area (EMSA) of at least 20 m$^2$/g and, more preferably, at least 35 m$^2$/g up to 200 m$^2$/g or higher are preferred. Surface area values may be determined by ASTM D-1765 using the cetyltrimethyl-ammonium bromide (CTAB) technique. Among the useful carbon blacks are furnace black, channel blacks and lamp blacks. More specifically, examples of useful carbon blacks include super abrasion furnace (SAF) blacks, high abrasion furnace (HAF) blacks, fast extrusion furnace (FEF) blacks, fine furnace (FF) blacks, intermediate super abrasion furnace (ISAF) blacks, semi-reinforcing furnace (SRF) blacks, medium processing channel blacks, hard processing channel blacks and conducting channel blacks. Other carbon blacks which can be utilized include acetylene blacks. A mixture of two or more of the above blacks may also be used. Exemplary carbon blacks include N-110, N-220, N-339, N-330, N-343, N-351, N-550, N-660, and the like, as designated by ASTM D-1765-82a. The carbon blacks utilized may be in pelletized form or an unpelletized flocculent mass. Preferably, for more uniform mixing, unpelletized carbon black is preferred.

A typical amount of carbon black may broadly range from about 5 phr to about 200 phr, preferably from about 10 phr to about 150 phr, and more preferably from about 50 phr to about 100 phr, based on 100 phr rubbery matrix in the composition.

A combination of silica and carbon black is utilized for reinforcing fillers for various rubber products, including treads for tires.

Other fillers can be utilized within the disclosed compositions as processing aids which include, but are not limited to, mineral fillers, such as aluminum silicate, calcium silicate, magnesium silicate, clay (hydrous aluminum silicate), talc (hydrous magnesium silicate), and mica as well as non-mineral fillers such as urea and sodium sulfate. Preferred micas contain principally alumina, silica and potash, although other variants are also useful.

In exemplified embodiments, an antioxidant under the trade name of Santoflex 13 was used in an amount of 0.1-5 phr, such as 0.95 phr, based on 100 phr rubbery matrix of the composition. Santoflex 13 is N-(1,3-dimethylbutyl)-N'-phenyl-p-phenylene diamine purchased from Monsanto (St. Louis, Mo.).

A vulcanizing agent can be used to cure the disclosed compositions that comprise a rubbery matrix and polymer nanoparticles. For a general disclosure of suitable vulcanizing agents, one can refer to Kirk-Othmer, *Encyclopedia of Chemical Technology*, 3$^{rd}$ ed., Wiley Interscience, N.Y. 1982, Vol. 20, pp. 365 to 468, particularly "Vulcanization Agents and Auxiliary Materials," pp. 390 to 402. Vulcanizing agents can be used alone or in combination. In preferred embodiments, sulfur or peroxide-based vulcanizing agent may be employed. Examples of suitable sulfur vulcanizing agents include "rubber maker's" soluble sulfur; elemental sulfur (free sulfur); sulfur donating vulcanizing agents such as organosilane polysulfides, amine disulfides, polymeric polysulfides or sulfur olefin adducts; and insoluble polymeric sulfur. Preferably, the sulfur vulcanizing agent is soluble sulfur or a mixture of soluble and insoluble polymeric sulfur.

Typical amount of vulcanizing agent such as sulfur may broadly range from about 0.1 phr to about 10 phr, preferably from about 0.5 phr to about 5 phr, and more preferably from about 1 phr to about 4 phr, based on 100 phr rubbery matrix in the composition.

A vulcanization accelerator may be used along with a vulcanizing agent to control the time and/or temperature required for vulcanization and to improve properties of the vulcanizate. The vulcanization accelerators suitable for use in the disclosed compositions are not particularly limited. Examples of vulcanization accelerator include thiazol vulcanization accelerators, such as 2-mercaptobenzothiazol, dibenzothiazyl disulfide, N-cyclohexyl-2-benzothiazyl-sulfenamide (CBS), N-tert-butyl-2-benzothiazyl sulfenamide (TBBS), and the like; guanidine vulcanization accelerators, such as diphenylguanidine (DPG) and the like; amines; disulfides; thiurams; sulfenamides; dithiocarbamates; xanthates; and thioureas; among others.

The disclosed compositions may be compounded by methods generally known in the rubber compounding art, such as mixing the rubbery matrix polymer, the N-substituted polyalkylene succinimide derivative, and the silica filler with conventional amounts of various commonly used additive materials, using standard rubber mixing equipment and procedures.

A vulcanized rubber product may be produced from the compositions described herein by thermomechanically mixing a liquid polymer, a rubbery matrix polymer, the N-substituted polyalkylene succinimide derivative, the silica filler, and various ingredients in a sequentially step-wise manner in a rubber mixer, followed by shaping and curing the composition. By thermomechanical mixing, it is meant that various ingredients in the composition are mixed under high shear conditions where the composition autogeneously heats up, with an accompanying temperature rise, as a result of the mixing primarily due to shear and associated friction within the composition in the rubber mixer.

For example, a composition typically exclusive of free sulfur and sulfur vulcanization accelerators is blended in at least one, and usually at least two, sequential, preparatory thermomechanical mixing stage(s) in suitable mixers, usually internal rubber mixers. Such preparatory mixing is often referred to as "non-productive mixing", or "non-productive mixing steps or stages". Such preparatory mixing may be conducted, for example, at temperatures in a range of about 70° C. to 200° C. and more often in a range of about 90° C. to about 150° C. Subsequent to such preparatory mix stage(s), a vulcanizing agent such as free sulfur and vulcanization accelerators, and optionally one or more additional ingredients, are mixed into the composition, in a final productive mix stage, typically at a temperature within a range of about 70° C. to about 150° C., which is a lower temperature than the temperatures utilized in the aforesaid preparatory mix stage(s) in order to prevent or retard premature curing or unwanted precure of the sulfur-curable rubber, which is sometimes referred to as "scorching", of the rubber composition. Such sequential, non-productive mixing steps and the subsequent productive mixing step are well known to those in the rubber mixing art.

One or more remill steps may be employed during the above process for the purposes of reducing the compound viscosity, and improving the dispersion of fillers, among others. In remill step(s), either no ingredients are added to the mixture, or non-curing ingredients are added. The temperature of the remill step is typically in a range of about 70° C. to 150° C. and more often in a range of about 70° C. to about 120° C.

The rate of cure of the composition can be controlled and optimized. The "rate of cure" is defined as the rate at which crosslinking and the development of the stiffness (modulus) of a rubber compound occurs. As the rubber compound is heated, the properties of the rubber compound change from a soft plastic to a tough elastic material. During the curing step, crosslinks are introduced, which connect the long polymer chains of the rubber. As more crosslinks are introduced, the polymer chains become more firmly connected and the stiffness or modulus of the compound increases. The rate of cure in part determines the time the compound must be cured, i.e., the "cure time." In the manufacture of vulcanized rubber articles, significant cost savings can be realized through a reduction of cure time.

Rubber articles such as tires may be manufactured from the composition as described supra. References for this purpose may be made to, for example, U.S. patent application No. 2004/0143064 A1.

The compositions described herein can be used for various purposes. For example, it can be used for various rubber compounds, such as a tire treadstock, sidewall stock or other tire component stock compounds. Such tires can be built, shaped, molded and cured by various methods which are known and will be readily apparent to those having skill in such art. In an embodiment, a molded unvulcanized tire is charged into a vulcanizing mold and then vulcanized to produce a tire, based on the composition and the procedure as described above.

For rubber articles such as a vehicle tire, important properties such as tread wear/durability, wet/dry traction and rolling resistance can be somewhat determined by the composition of the tread compound. For example, snow and ice traction may be reflected by G' at −20° C.; wet traction may be reflected by tan δ at 0° C., Stanley London Index, and Wet Traction Coefficient μ; rolling resistance may be reflected by tan δ at 50° C.; reinforcement of a rubber product may be reflected by a low strain dynamic modulus G', as can be measured according to ASTM-D 412 at 22° C.; tensile strength may be reflected by tensile at break, according to ASTM-D412.

The following examples are included to provide additional guidance to those skilled in the art. The examples provided are merely representative of the work that contributes to the teaching of the present application. Accordingly, these examples are not intended to limit the invention, as defined in the appended claims, in any manner.

EXAMPLES

Example 1

211 g of polysiobutylene succinic anhydride (with Mw=1900, Mn=1000), 95 meq of COOH/100 g, from Chevron Chemicals under name OLOA 15500) and 10.24 g of 3-(dimethylamineo) propylamine (from Aldrich) was charged into a dry 1.5 L bottle. The two materials were then mixed vigorously for one hour. It has been observed that chemical reaction occurred as the temperature of the liquid increased from 23° C. to 65° C. After that, the reacted material in the bottle was allowed to cool by exposure to room temperature for 4 hrs. Then, the material was placed in a vacuum oven at 110° C. to finish the imidization reaction for 20 hours. The final product was a brownish viscous liquid.

Example 2

The same procedure as provided in Example 1 was used except that 15.75 g of trimethylene glycol di-p-aminobenzoate (99% pure, from Aldrich) was used instead of 10.24 g 3-(dimethylamino)propylamine. The final product was (again) a brownish viscous liquid.

Example 3

The same procedure as provided in Example 1 was used except that 22.19 g of 3-aminopropyltriethoxysilane (99% pure, from Aldrich) was used instead of 10.24 g 3-(dimethylamino)propylamine. The final product was (again) a brownish viscous liquid.

Example 4

The same procedure as provided in Example 1 was used except that 215 g of polysiobutylene succinic anhydride (OLOA 15500) (instead of 211 g) and 12.78 g of 1-(3-aminopropyl) imidazole (98% pure, from Aldrich) (instead of 10.24 g 3-(dimethylamino)propylamine) were used. The final product was (again) a brownish viscous liquid.

Examples 5-14

Applications in Rubber Compounding

Ten kinds of rubber compositions were prepared according to the formulation shown in Tables 1 and 2 by selectively using the materials synthesized in Examples 1-4 to replace some or all of the aromatic oil in the compound formulation listed in Table 1. In each sample, a blend of the ingredients was kneaded by a method listed in Table 3. The final stock was sheeted and molded at 165° C. for 15 minutes.

TABLE 1

| Composition for Mater Batch (phr) | |
|---|---|
| SBR (HX263) | 100.00 |
| Precipitated silica filter | 70.00 |
| Aromatic Oil | 30.00 |
| Wax | 1.50 |
| Stearic Acid | 2.00 |
| Santoflex 13 (antioxidants) | 0.95 |
| Si 69 (Silane Coupling Agent) | 8.00 |

TABLE 2

| Composition for Final Batch | |
|---|---|
| Sulfur | 1.70 |
| N-(cyclohexylthio) phthalimide (retarder) | 0.25 |
| Zinc Oxide | 2.50 |
| Cyclohexyl-benzothiazole sulfenamide (accelerator) | 1.50 |
| Diphenylguanidine (accelerator) | 0.50 |

TABLE 3

| Mixing Conditions | |
|---|---|
| Mixer: 300 g Brabender | Agitation Speed: 60 rpm |
| Master Batch Stage | |
| Initial Temperature | 110° |
| 0 min. | charging polymers |
| 0.5 min | charging oil and Carbon Black |
| 5.0 min | drop |
| Remill Stage | |
| Initial Temperature | 110° C. |
| 0 min | charging stocks |
| 5.0 min | drop |
| Final Batch Stage | |
| Initial Temperature | 75° C. |
| 0 sec | charging master stock |
| 30 sec | charging curing agent and accelerators |
| 75 sec | drop |

Of the vulcanized rubber compounds, measurement of the tensile strength, tear strength, hysteresis loss gave the results as shown in Table 4. Measurement of tensile strength was based on conditions of ASTM-D 412 at 22° C. Test specimen geometry was in the form of a ring of a width of 1.27 mm and of a thickness of 1.91 mm. The specimen was tested at a specific gauge length of 1.0 inches. Test specimen geometry was in the form of a nicked ring (ASTM-624-C). The specimen was tested at the specific gauge length of 1.750 inches. The hysteresis loss was measured with a Dynastat Viscoelastic Analyzer. Test specimen geometry was in the form of a strip of a length of 30 mm and of a width of 15 mm. The following testing conditions were employed: frequency 5 Hz, 2% strain. Measurement of the wet traction was performed on two instruments. One is the British Portable Skid Tester [see the Road Research Laboratory Technical Paper No. 66 by C. G. Giles et al. London, (1966)]. The sample geometry for the test is a rectangle bar of 2.5×76×6.35 mm. The details of the BPST are described in ASTM E-303, Vol. 04.03. It is a portable device in which the specimen is attached to the base of a pendulum arm and contacts the opposing surface during a swing of the pendulum. The weighted pendulum head is free to move vertically on the pendulum arm so that the swing amplitude is determined the friction of the rubber against the pavement surface. The lower the amplitude that a pendulum swing up after contacting the surface (recorded as a higher value on the scale of the tester), the higher the friction of the rubber against the surface. This instrument is very well adapted to testing the wet traction of the rubbers. The other instrument utilized for wet traction testing was a turn table.

TABLE 4

| | Compounding Results | | | | | | | | | |
|---|---|---|---|---|---|---|---|---|---|---|
| | Ex 5 | Ex 6 | Ex 7 | Ex 8 | Ex 9 | Ex 10 | Ex 11 | Ex 12 | Ex 13 | Ex 14 |
| Compound Ingredients | | | | | | | | | | |
| SBR | 100 | 100 | 100 | 100 | 100 | 100 | 100 | 100 | 100 | 100 |
| SiO filler (phr) | 70 | 70 | 70 | 70 | 70 | 70 | 70 | 70 | 70 | 70 |
| Aromatic oil (phr) | | | | | 30 | 15 | 15 | 15 | 15 | 30 |
| Example 1 (phr) | 30 | | | | | 15 | | | | |
| Example 2 phr) | | 30 | | | | | 15 | | | |
| Example 3 (phr) | | | 30 | | | | | 15 | | |
| Example 4 (phr) | | | | 30 | | | | | 15 | |
| Sulfur (phr) | 1.7 | 1.7 | 1.7 | 1.7 | 1.7 | 1.7 | 1.7 | 1.7 | 1.7 | 2.1 |

TABLE 4-continued

Compounding Results

| | Ex 5 | Ex 6 | Ex 7 | Ex 8 | Ex 9 | Ex 10 | Ex 11 | Ex 12 | Ex 13 | Ex 14 |
|---|---|---|---|---|---|---|---|---|---|---|
| Experiment Results | | | | | | | | | | |
| MDR 2000 165° C. MH | 20.1 | 16.4 | 16.4 | 16.6 | 19.8 | 20.4 | 19.0 | 17.9 | 20.4 | 21.1 |
| T90 | 13.7 | 23.7 | 11.4 | 10.3 | 18.0 | 10.5 | 18.3 | 10.8 | 12.2 | 16.0 |
| Ring Tensile 23° C. | | | | | | | | | | |
| Tb (MPa) | 15.9 | 16.7 | 14.8 | 13.5 | 18.5 | 20.4 | 20.8 | 19.4 | 19.6 | 18.4 |
| Eb (%) | 551 | 613 | 590 | 505 | 569.0 | 593 | 625 | 626 | 625 | 514 |
| Tb * Eb | 8770 | 10200 | 8710 | 6810 | 10500 | 12100 | 13000 | 12100 | 12300 | 9460 |
| M300 | 6.27 | 5.49 | 5.36 | 6.22 | 7.08 | 7.73 | 6.82 | 6.25 | 6.43 | 8.37 |
| M50 | 1.1 | 1.05 | 1.04 | 1.11 | 1.00 | 1.17 | 1.09 | 1.05 | 1.04 | 1.13 |
| 100° C. | | | | | | | | | | |
| Tb (MPa) | 7.23 | 8.80 | 6.81 | 6.42 | 7.76 | 8.24 | 9.02 | 8.17 | 8.21 | 8.81 |
| Eb (%) | 367 | 464 | 404 | 344 | 353 | 351 | 397 | 384 | 390 | 332 |
| Tb * Eb | 2650 | 4080 | 2750 | 2210 | 2740 | 2890 | 3580 | 3140 | 3200 | 2930 |
| M300 | 5.35 | 4.59 | 4.46 | 5.26 | 6.19 | 6.62 | 5.93 | 5.69 | 6.62 | 8.18 |
| M50 | 0.89 | 0.78 | 0.8 | 0.87 | 0.84 | 0.96 | 0.87 | 0.89 | 0.86 | 0.93 |
| Tg of Compound (tan δ) ° C. | −45.0 | −47.0 | −46.0 | 47.0 | −42.0 | −44.0 | −45.0 | −44.0 | −44.0 | −42.0 |
| British Portable/ Stanley London (wet traction) | 60.4 | 59.8 | 61.4 | 62.8 | 57.6 | 60.0 | 60.4 | 61.6 | 64.2 | 59.0 |
| Turn table (wet traction) | | | | | | | | | | |
| μ peak 17° C. | 100 | 103 | 88.0 | 101 | 91.0 | 96.0 | 95.0 | 98.0 | 98.0 | 98.0 |
| μ sliding 17° C. | 100 | 113 | 105 | 107 | 100 | 102 | 94.0 | 94.0 | 93.0 | 87.0 |
| Rolling Resistance | | | | | | | | | | |
| (tan δ) 50° C. | 0.108 | 0.134 | 0.139 | 0.101 | 0.143 | 0.114 | 0.136 | 0.142 | 0.121 | 0.131 |
| G' (MPa) | 9.80 | 10.5 | 6.77 | 9.82 | 6.32 | 9.76 | 9.30 | 7.32 | 8.85 | 7.06 |
| (tan δ) 25° C. | 0.129 | 0.132 | 0.166 | 0.125 | 0.153 | 0.130 | 0.141 | 0.159 | 0.145 | 0.147 |
| G' (MPa) | 12.5 | 14.6 | 10.1 | 12.7 | 8.37 | 12.7 | 13.2 | 10.5 | 11.6 | 9.45 |
| (tan δ) 0° C. | 0.150 | 0.141 | 0.187 | 0.149 | 0.170 | 0.152 | 0.151 | 0.178 | 0.165 | 0.169 |
| G' (MPa) | 17.4 | 20.6 | 15.8 | 17.8 | 12.9 | 18.0 | 19.4 | 16.2 | 17.1 | 14.3 |
| (tan δ) −20° C. | 0.204 | 0.188 | 0.231 | 0.200 | 0.236 | 0.231 | 0.231 | 224 | 0.214 | 0.237 |
| G' (MPa) | 26.0 | 30.2 | 26.2 | 26.3 | 22.3 | 31.2 | 34.4 | 26.5 | 26.7 | 24.6 |
| (tan δ) −50° C. | 0.608 | 0.615 | 0.619 | 0.638 | 0.342 | 0.426 | 0.485 | 0.437 | 0.443 | 0.291 |
| G' (MPa) | 305 | 278 | 280 | 263 | 675 | 549 | 456 | 548 | 545 | 749 |
| Payne effect at 25° C. | | | | | | | | | | |
| ΔG' (MPa, 0.25 to 14% strain) | 8.30 | 10.5 | 5.20 | 7.50 | 50.6 | 7.73 | 8.88 | 5.96 | 6.97 | 5.10 |

Figure 2:
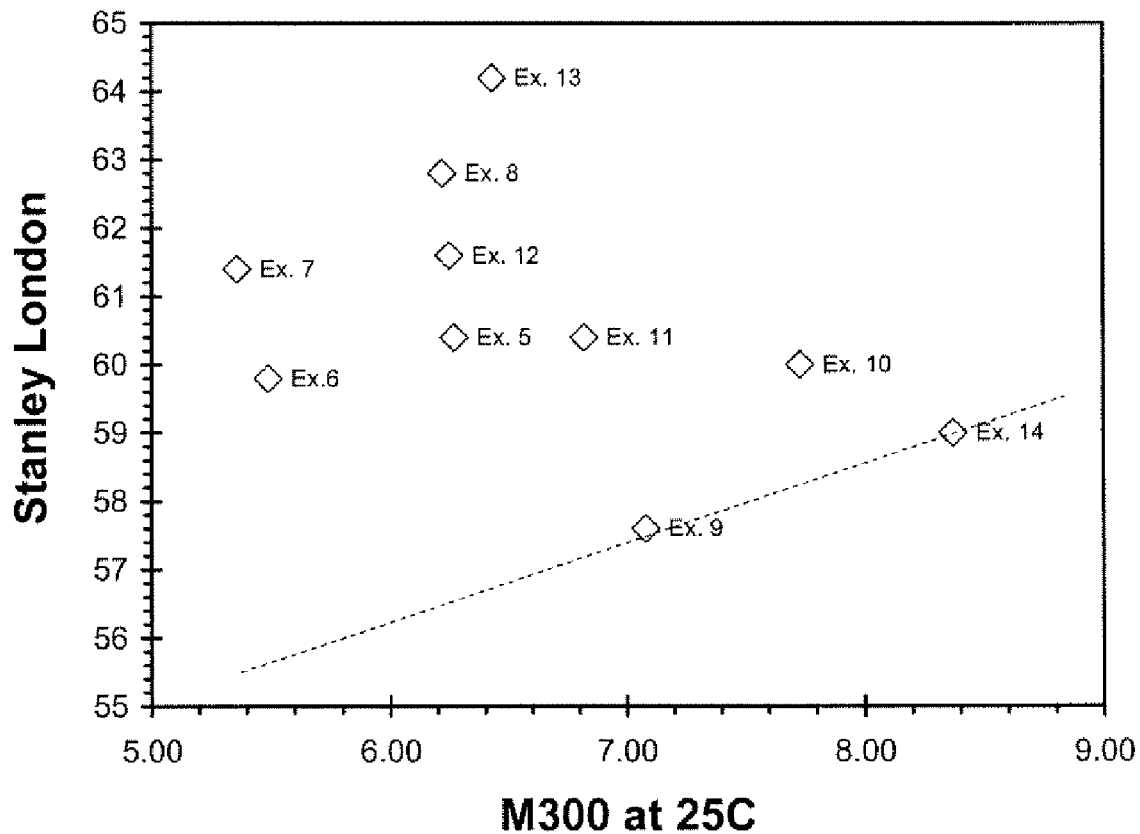
FIG. 2 shows the Stanley London values and M300 at 25° C. values of the rubber samples in an example.
Figure 3:
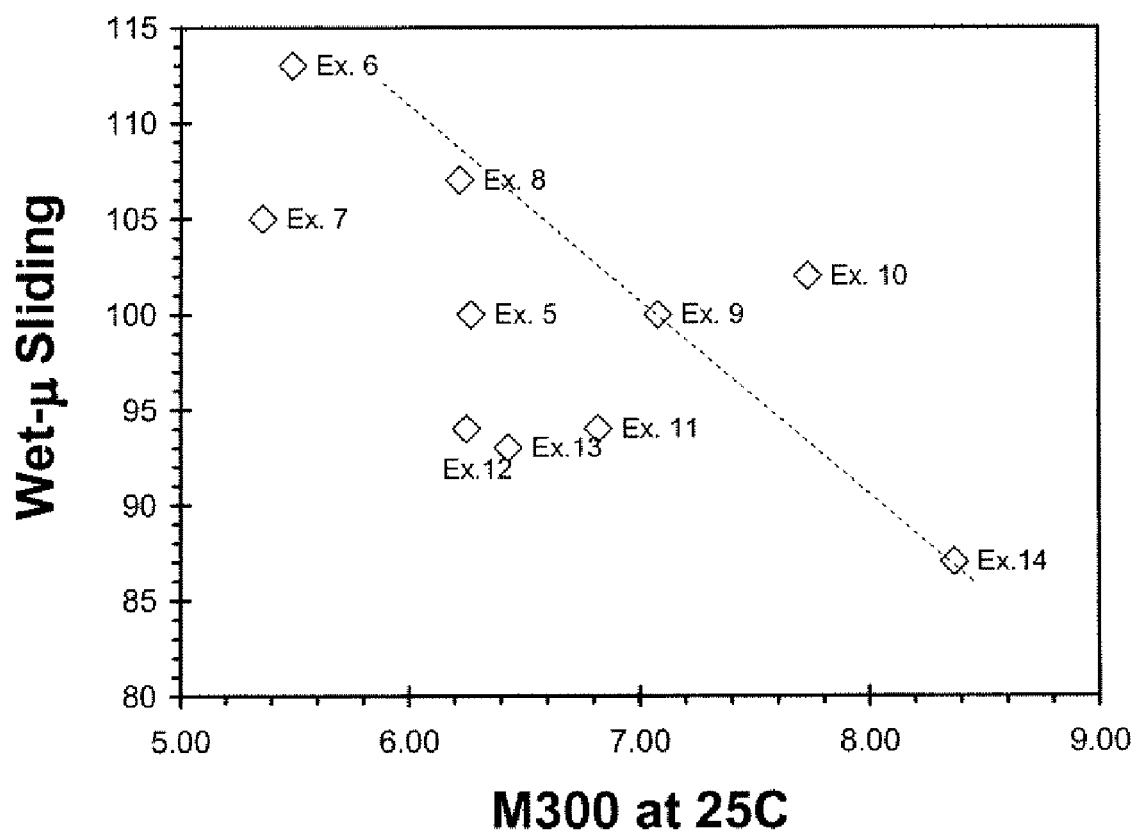
FIG. 3 shows the Wet-μ Sliding values and M300 at 25° C. values of the rubber samples in an example.
Figure 4:
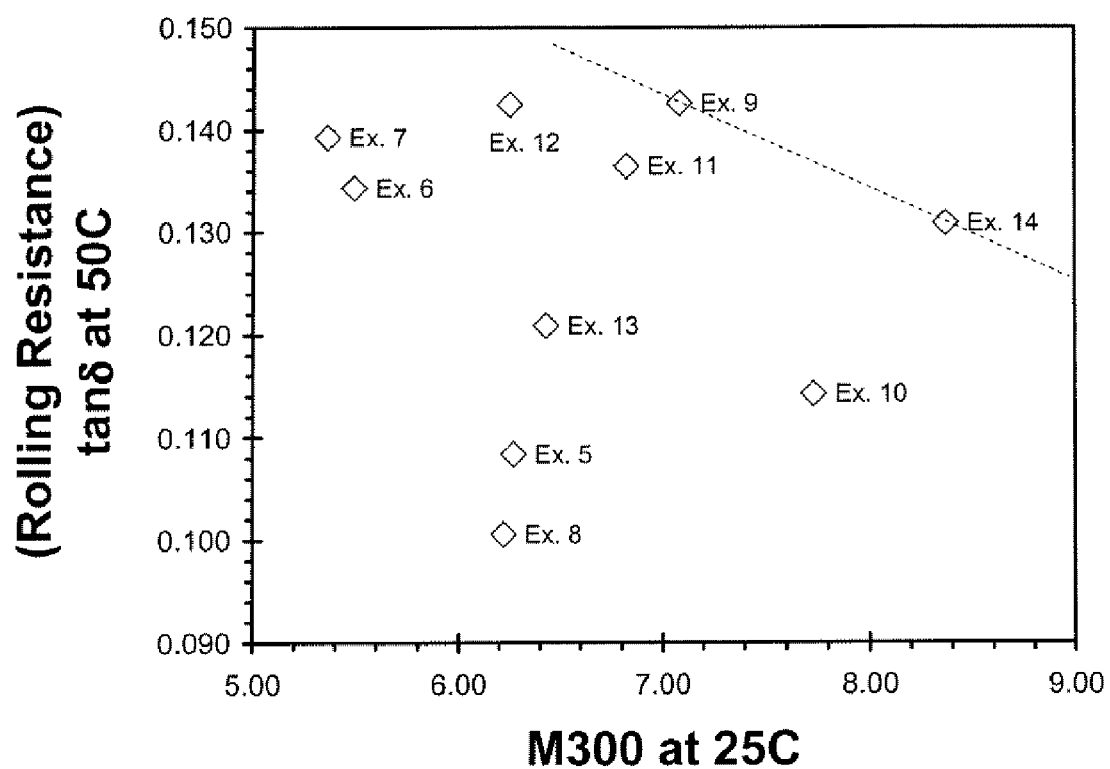
FIG. 4 shows the (RoRo) tanδ at 50° C. values and M300 at 25° C. values of the rubber samples in an example.
Figure 5:
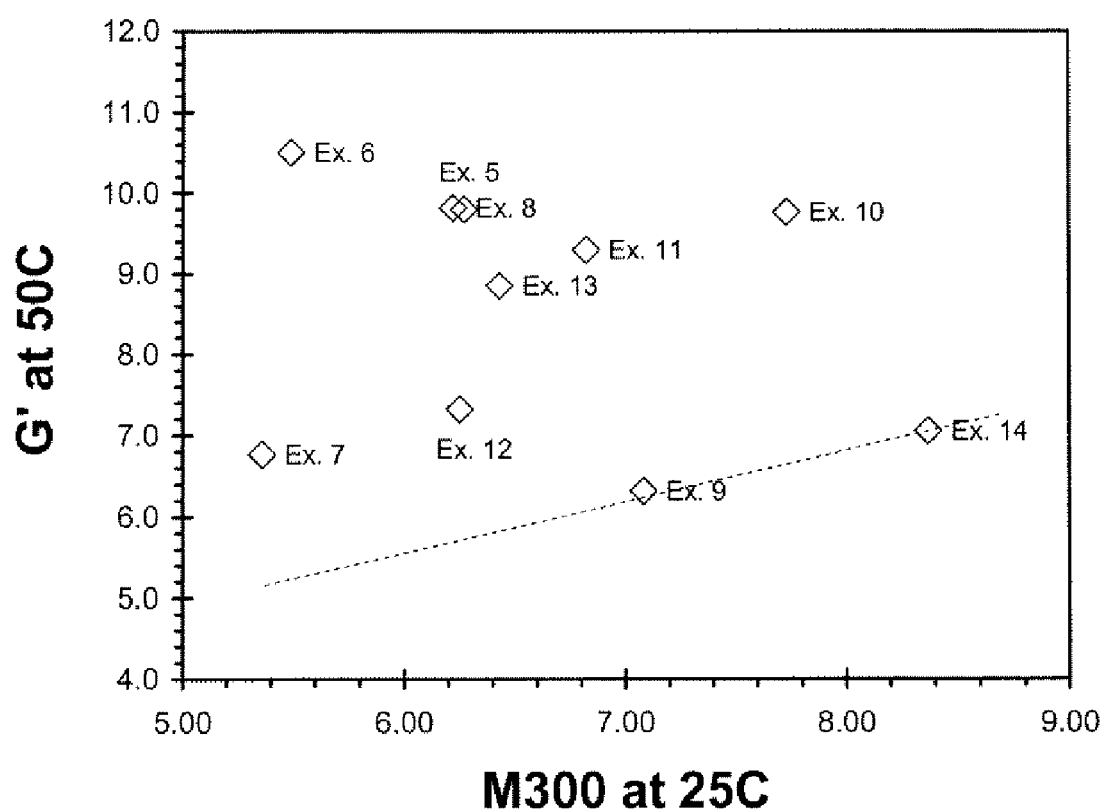
FIG. 5 shows the G' at 50° C. values and M300 at 25° C. values of the rubber samples in an example.
Figure 6:
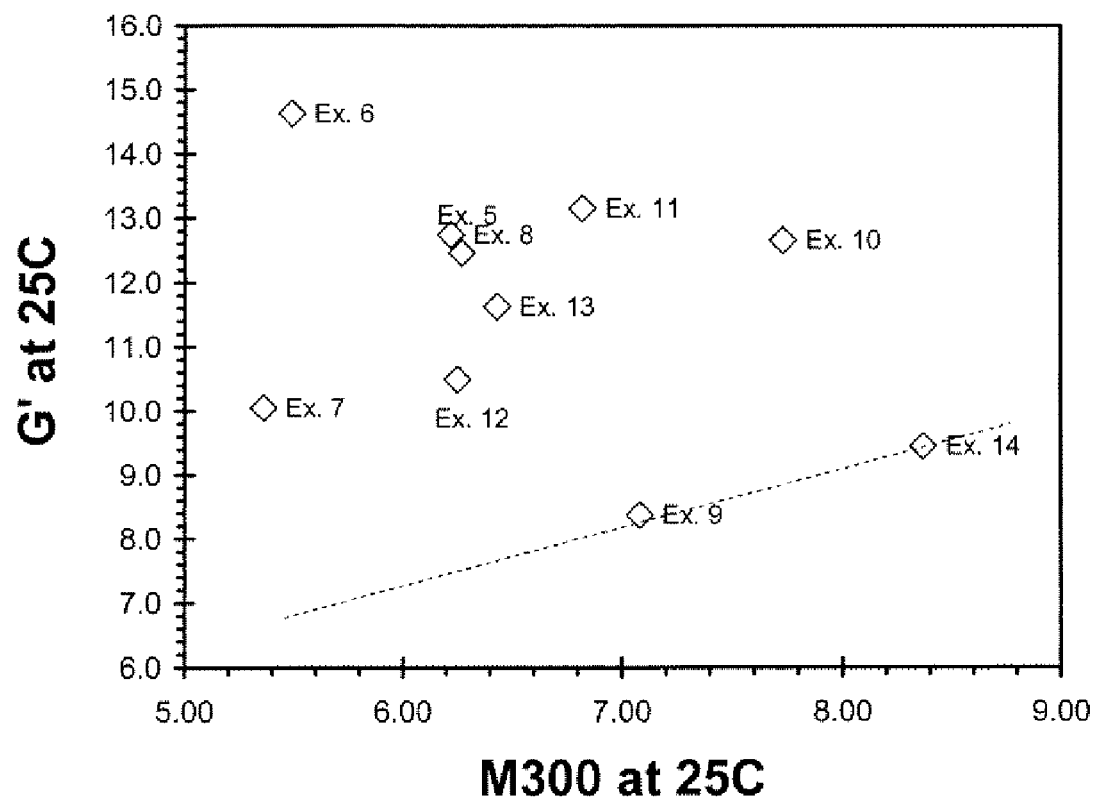
FIG. 6 shows the G' at 25° C. values and M300 at 25° C. values of the rubber samples in an example.
Figure 7:
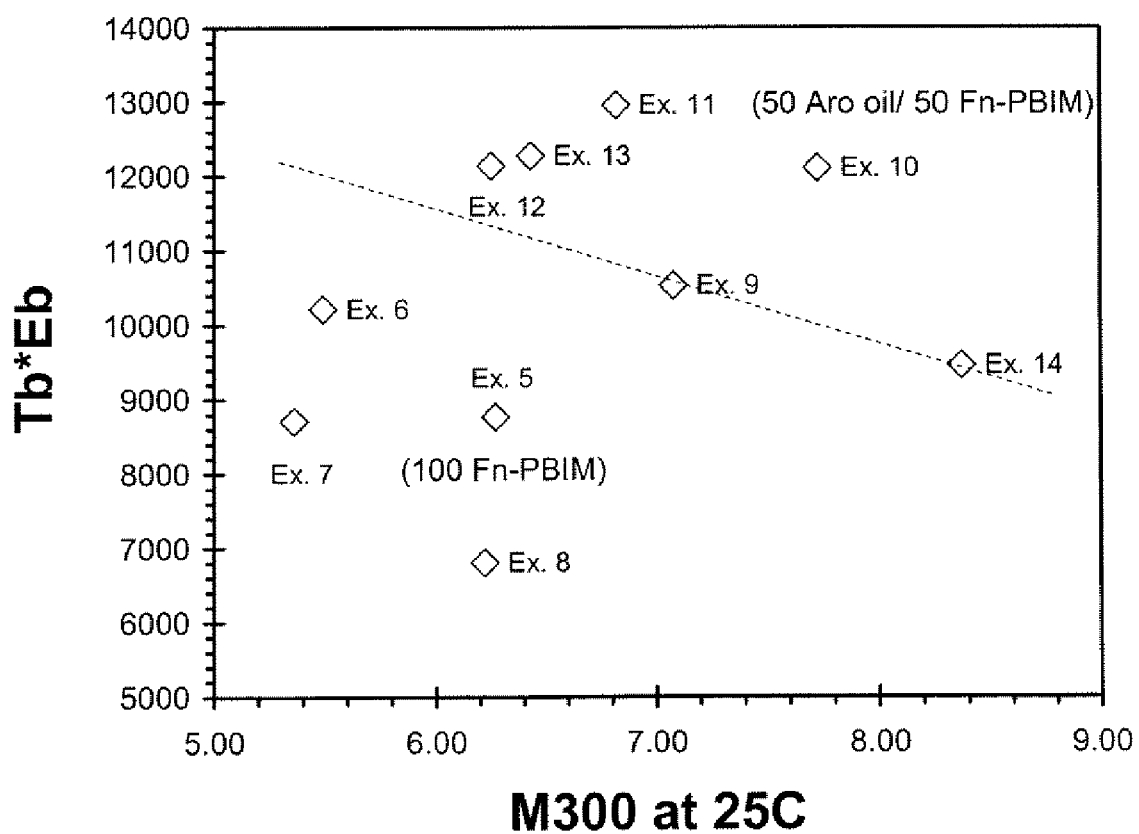
FIG. 7 shows the Tb*Eb values and M300 at 25° C. values of the rubber samples in an example.
Figure 8:
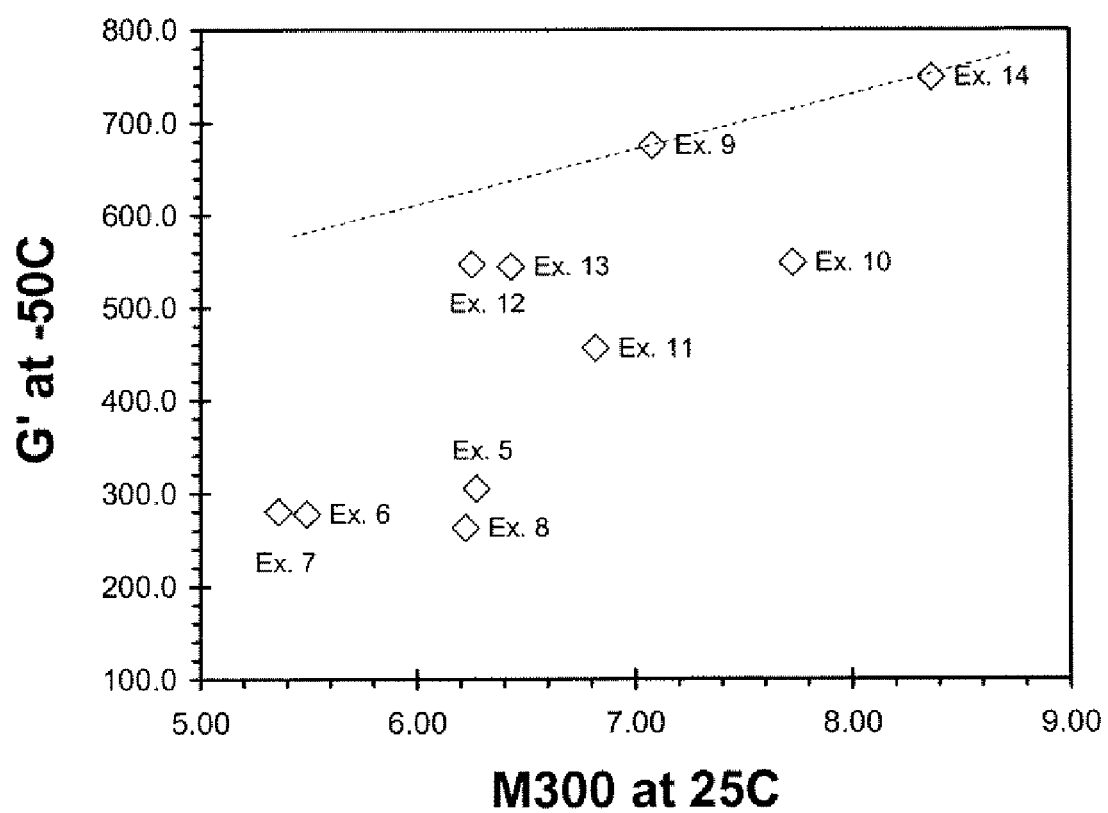
FIG. 8 shows the G' at −50° C. values and M300 at 25° C. values of the rubber samples in an example.

FIGS. 1-8 graphically indicate that rubber articles such as tires made from such composition can exhibit unexpected properties such as reduced rolling resistance, improved wet/snow traction and winter softness, improved dynamic stiffness, improved tensile strength, easy handling, and/or compatibility with higher environmental standard, among others. Examples 5 to 8 and 10-13 are test examples. Example 9 and Example 14 are controls.

While the invention has been illustrated and described in typical embodiments, it is not intended to be limited to the details shown, since various modifications and substitutions can be made without departing in any way from the spirit of the present invention. As such, further modifications and equivalents of the invention herein disclosed may occur to persons skilled in the art using no more than routine experimentation, and all such modifications and equivalents are believed to be within the spirit and scope of the invention as defined by the following claims.

The invention claimed is:

1. A reduced oil rubber composition comprising (a) a silica filler, (b) a N-substituted polyalkylene succinimide derivative, and (c) a rubber matrix wherein the N-substituted polyalkylene succinimide derivative is represented by the general formula (I):

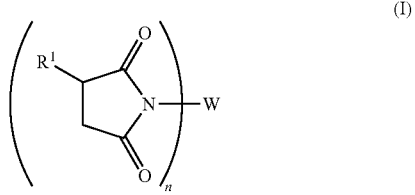

(I)

wherein R¹ is a polyalkylene group, n is 1 or 2, and W is a group containing nitrogen, silicon, oxygen, and combinations thereof
wherein the polyalkylene group in the N-substituted polyalkylene succinimide derivative is:

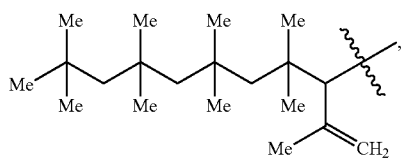

wherein Me represents methyl group.

2. The composition of claim 1, wherein the N-substituted polyalkylene succinimide derivative is selected from the group consisting of compounds with formulas (Ia-1), (Ib-1), (Ic-1), (Id-1), and any combination thereof:

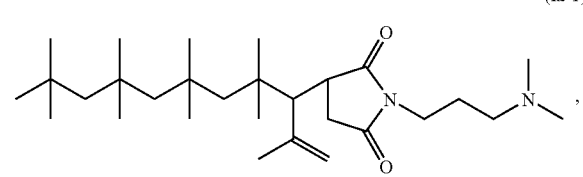
(Ia-1)

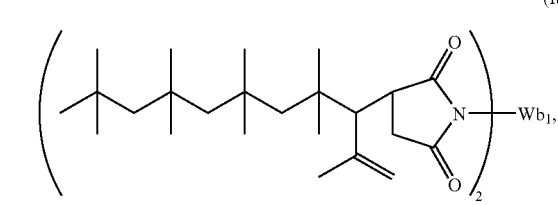
(Ib-1)

wherein —Wb1- is:

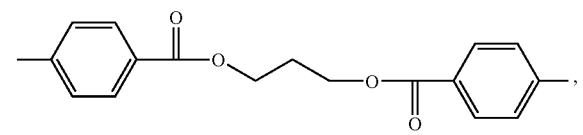

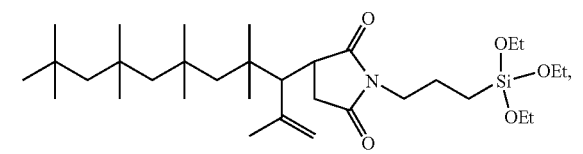
(Ic-1)

wherein Et represents ethyl group; and

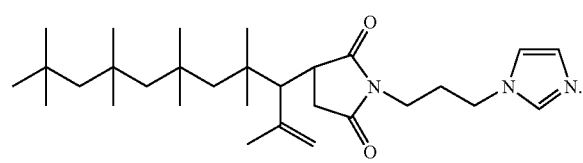
(Id-1)

3. The composition according to claim 1, in which the N-substituted polyalkylene succinimide derivative is prepared from polyisobutenyl succinic anhydride and amine compound.

4. The composition according to claim 1, in which the N-substituted polyalkylene succinimide derivative has formula (Ia-1):

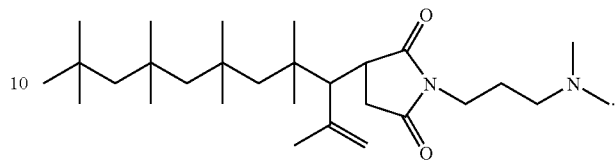
(Ia-1)

5. The composition according to claim 1, in which the N-substituted polyalkylene succinimide derivative has formula (Ib-1):

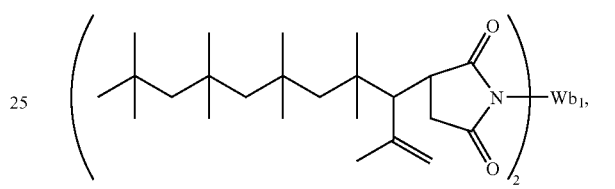
(Ib-1)

wherein —Wb1- is:

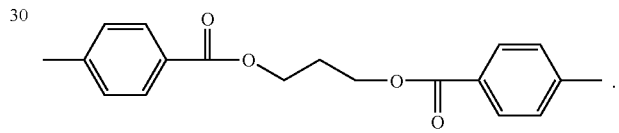

6. The composition according to claim 1, in which the N-substituted polyalkylene succinimide derivative has formula (Ic-1):

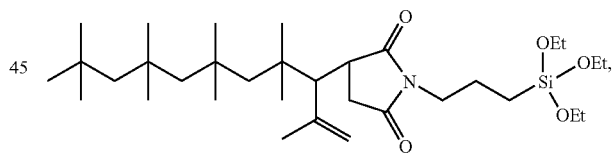
(Ic-1)

wherein Et represents ethyl group.

7. The composition according to claim 1, in which the N-substituted polyalkylene succinimide derivative has formula (Id-1):

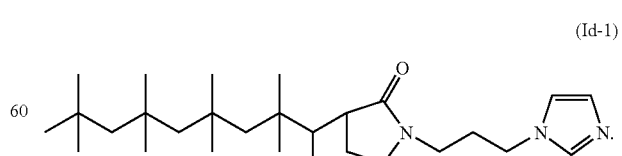
(Id-1)

8. The composition according to claim 1, in which the amount of the N-substituted polyalkylene succinimide derivative in the composition ranges from about 15 phr to about 30 phr, based on 100 phr rubber matrix of the composition.

9. The composition according to claim 1, in which the silica filler comprises precipitated silica filler, fused silica filler, colloidal silica filler, or any mixture thereof, wherein the aggregated size of the silica ranges from about 10 nm to about 20 μm.

10. The composition according to claim 1, in which the amount of the silica filler ranges from about 5 phr to about 200 phr, based on 100 phr rubber matrix of the composition.

11. The composition according to claim 1, in which the amount of the silica filler ranges from about 60 phr to about 80 phr, based on 100 phr rubber matrix of the composition.

12. The composition according to claim 1, in which the rubber matrix comprises polyisoprene rubber, styrene-butadiene rubber (SBR), styrene-isoprene-butadiene rubber, styrene-isoprene rubber, butadiene-isoprene rubber, polybutadiene, butyl rubber, neoprene, ethylene-propylene rubber, ethylene-propylene-diene rubber (EPDM), acrylonitrile-butadiene rubber (NBR), silicone rubber, the fluoroelastomers, ethylene acrylic rubber, ethylene vinyl acetate copolymer (EVA), epichlorohydrin rubbers, chlorinated polyethylene rubbers, chlorosulfonated polyethylene rubbers, hydrogenated nitrile rubber, tetrafluoroethylene-propylene rubber, or the mixture thereof.

13. The composition according to claim 1, further comprises an oil selected from aromatic oil, naphthenic oil, paraffinic oil, low PCA oil, and mixtures thereof.

14. The composition according to claim 13, in which the amount of the oil is up to about 25 phr, based on 100 phr of rubber matrix in the composition.

15. The composition according to claim 14, in which the total amount of aromatic oil in the composition is less than 20 phr.

16. A tire including the composition of claim 1.

17. A power belt including the composition of claim 1.

* * * * *